United States Patent [19]

Travaly

[11] Patent Number: 5,581,869
[45] Date of Patent: Dec. 10, 1996

[54] REPAIR METHOD FOR SEALING LIQUID-COOLED STATOR BAR END FITTINGS FOR A GENERATOR

[75] Inventor: Andrew J. Travaly, Ballston Spa, N.Y.

[73] Assignee: General Electric Co., Schenectady, N.Y.

[21] Appl. No.: 515,307

[22] Filed: Aug. 15, 1995

[51] Int. Cl.$^6$ ............................................. H02K 15/00
[52] U.S. Cl. ................ 29/596; 29/402.07; 29/402.16; 228/119; 310/42; 310/54
[58] Field of Search .................. 29/596, 598, 402.04, 29/402.05, 402.06, 402.07, 402.13, 402.16; 228/119; 310/54, 64, 65, 42

[56] References Cited

U.S. PATENT DOCUMENTS 4,274,021  6/1981  Kamiya et al. ............................ 310/54

*Primary Examiner*—Carl E. Hall
*Attorney, Agent, or Firm*—Nixon & Vanderhye

[57] ABSTRACT

The method includes repairing the stator bar end fittings used for the electrical and hydraulic connections at the stator bar ends of a generator with suitable integrity to be as good as new or better than an in-kind replacement with new components for the stator bar. The method addresses the need to repair leaks in liquid cooled generator end windings and the respective end fittings. In particular, the method repairs leaks that develop between the joints of interior adjacent strands and between the outermost strands and the end fitting. The method employs the replacement of the original end fitting with another end fitting similar in geometry. A majority of the original end fitting along with the original window (if any) is preserved and utilized as a ring to surround and compress the strand bundle, with the original braze intact, thus preserving the original geometry of the strand bundle. After repairing the strands, the machined ring is inserted into the replacement end fitting and brazed with an alloy with a lower temperature melting point than the original alloy in order to keep intact the prior brazing. The replacement end fitting of the repaired stator bar end may now be connected to the generator winding, insulated and returned to service in the same manner as that of a new stator bar.

22 Claims, 6 Drawing Sheets

REPAIR METHOD FOR SEALING LIQUID-COOLED STATOR BAR END FITTINGS FOR A GENERATOR

TECHNICAL FIELD

The present invention relates to a method of repairing a stator bar of a generator and particularly to a method for repairing leaks between the stator bar end fitting and the outermost strands of the end of the stator bar, as well as between the strands of the end of the stator bar.

BACKGROUND

Water-cooled stator bars for electrical generators are comprised of a plurality of small rectangular solid and hollow copper strands which are brazed to one another within the stator bar and brazed to the interior walls of an end fitting. The brazing material typically used is a copper phosphorous alloy. The end fitting serves as both an electrical and a hydraulic connection for the stator bar. The end fitting typically includes an enclosed chamber for ingress or egress of stator bar cooling liquid, typically deionized water. Thus, the end fitting provides a hollow chamber which serves to manifold the water passages of the strands. Another opening of the end fitting receives the ends of the strands of the stator bar, the fitting and peripherally outermost copper strands of the stator bar being brazed to one another. Over time, leaks have variously developed about the connection between the stator bar ends and the stator bar end fitting as well as between adjacent strands. The end fitting-to-strand and strand-to-strand joints have the highest potential for causing damage should a leak occur because a leak at this location will flow directly into the ground wall insulation of the winding. The result is the degradation of the dielectric strength of the insulation which will eventually lead to failure. It is believed, based on leak analysis results, that the leak mechanism is due to a corrosion process which initiates in the braze alloy at the interior surface of the braze joint. Stagnant water in contact with the braze alloy and the copper strands is believed to cause corrosion and consequent leakage.

Field repair of leaks through the stator bar end connections has only been moderately successful. Typically, a leak site is identified by external visual examination methods where the strands enter the end fitting. External visual leak detection, however, can only indirectly identify the leak site because the external evidence of the leak may be located a considerable distance from the actual leak path. This is particularly true if the leak is occurring between the adjacent strands of the stator bar. Once a leak is identified in this manner, a vacuum is drawn inside the fitting and stator bar. An anaerobic cement is then applied externally around the suspected leak sites, the vacuum suction drawing the cement inwardly into the leak path. However, it has been found that this repair method is not 100% effective in repairing the leak and is therefore considered only a temporary repair. Another repair option, as described and illustrated in pending application Ser. No. 08/446,158 and of common assignee herewith, utilizes syringes and visual equipment to inject epoxy into the leak path. This process is limited by the space constraints of the hardware infringing on the syringe and visual equipment while on its way to the leak path.

Another alternative repair method, based on a method of original manufacture of the fittings dating to 1966 and used by the common assignee herewith, is the complete removal of the existing (original) end fitting of the stator bar so that the strands can be cleaned. After cleaning, a ring or sleeve is brazed onto the exterior surface of the strand bundle. As part of the repair, the joints between the strands as well as the joints between the strands and the ring can be brazed to fill any voids or water pathways. Finally, the ring and strand bundle can be inserted into a replacement fitting with the replacement fitting then brazed to the ring. This, however, is not a preferred repair method and was discontinued as an original construction method many years ago. This particular repair method is time consuming as it requires complete removal of the existing fitting. Another disadvantage is that the removal of the existing fitting in its entirely may adversely affect the integrity of the existing braze in the strand bundle. Also, and most importantly, this repair method involves a two part brazing process. The first braze is applied to the strand bundle and the ring which compresses and surrounds the strand bundle. The second braze is applied between the exterior surface of the ring and the interior of the replacement fitting.

Frequently, the inability to repair leakage through the stator bar end connections forces generator owners to replace the leaking bars or the entire stator winding to eliminate the leaks. An in-kind replacement with new components is not only expensive but requires significant generator downtime of approximately three to five weeks.

DISCLOSURE OF THE INVENTION

According to the present invention, a preferred method for repairing generator stator bar end fittings is accomplished such that the reliability of the repair will be "like new" or better and which is not limited by the type of end fitting used for the stator bar end electrical and hydraulic connections for a generator. This repair method involves the on-site removal of a majority of the original fitting to the extent that only a continuous ring surrounding the strand bundle remains. This ensures maintaining the original geometry and remaining integrity of the strand bundle since the original braze between adjacent strands, as well as between the original fitting and strands, remains undisturbed. The exterior of the ring that remains is then machined to achieve an acceptable tolerance for brazing with a replacement end fitting. Before final machining of the ring, the strand-to-strand and strand-to-end fitting joints can be cleaned, preferably with a chemical solvent, and then any voids or leakage paths that may be present between the strands or between the strands and the ring can be repaired by brazing. The repair alloy used in this brazing process, like the original alloy, is typically a copper phosphorous alloy. However, the repair alloy should have a higher concentration of silver or other element which ensures that the repair alloy has a lower temperature melting point than that of the original alloy. This is to prevent re-melting of the original alloy during the repair process.

Finally, the machined ring which surrounds the exterior periphery of the strands is inserted into a replacement end fitting and brazed. The final brazing process, like the repair brazing process, is accomplished without disturbing the remaining prior braze. The final braze uses a copper phosphorous alloy also having a melting point lower than the original and the leak path repair brazing alloy(s). For example, the original alloy might be BCuP-1, as designated by the American Society of Metals, with a temperature melting point of 1600 degrees Fahrenheit, the repair alloy might be BCuP-2 with a temperature melting point of 1450 degrees Fahrenheit and the alloy used in the final brazing might be BCuP-5 with a temperature melting point of 1300 degrees Fahrenheit. The main difference between these braze alloys is the concentration of silver whereby increasing the silver concentration will lower the temperature melting point of the alloy. Of course, other similar braze alloys may be used.

Accordingly, it is a primary object of the present invention to provide a novel and improved repair method for leaking generator stator bar end connections and particularly, in the preferred embodiment, to effect a repair of suitable integrity between the end fitting and the strands of the stator bar, as well as between the adjacent strands such that the reliability of the repair will be equivalent to or better than an in-kind replacement with new components and requiring approximately less than half the time to complete during a generator outage.

BEST MODE FOR CARRYING OUT THE INVENTION

Figure 1:
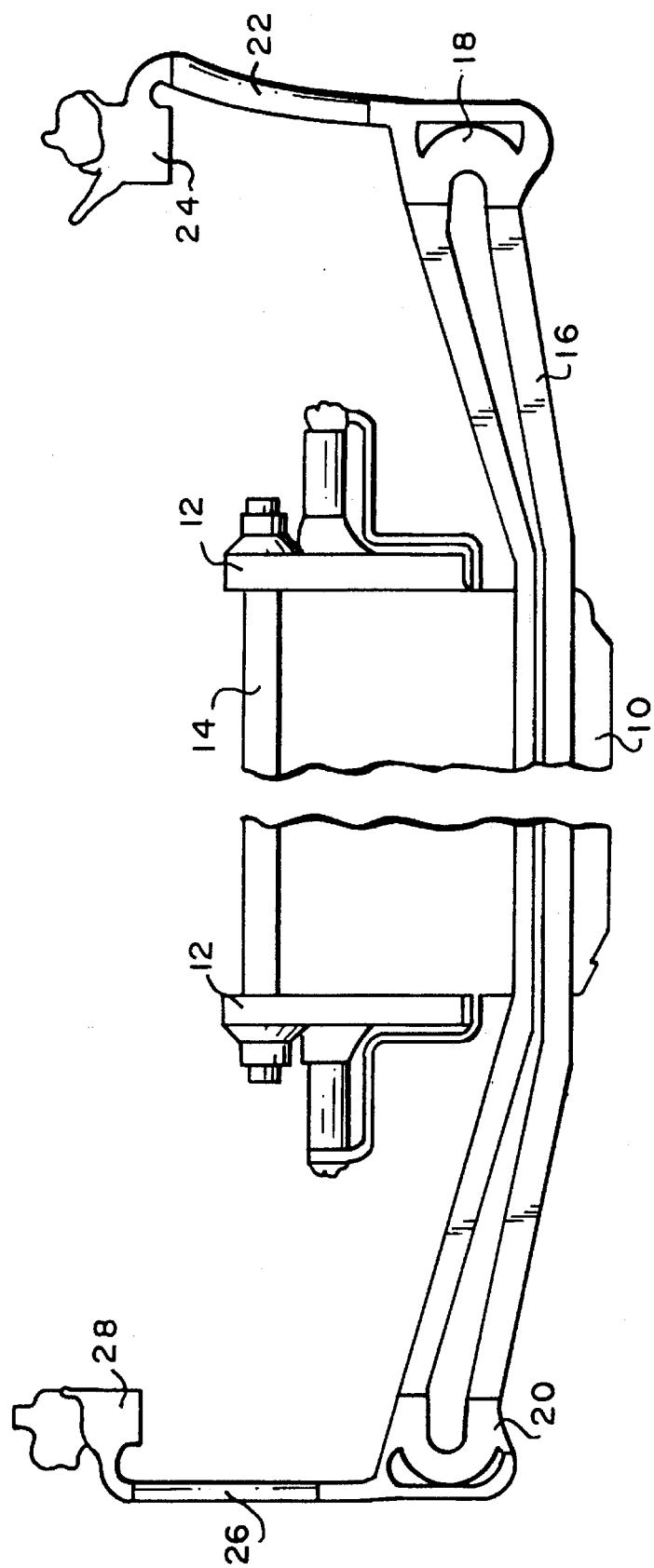
FIG. 1 is a schematic illustration of a liquid-cooled stator winding arrangement illustrating the stator bars and end fittings coupled to inlet and outlet coolant headers.

Referring now to the drawings, particularly to FIG. 1, there is illustrated a liquid-cooled stator winding arrangement used in a typical liquid-cooled generator. A stator core 10 having stator core flanges 12 and core ribs 14 are illustrated, with stator bars 16 passing through radially extending slots in the stator core 10 and terminating at opposite ends in inlet and outlet end fittings 18 and 20, respectively. Inlet hoses 22 connect inlet end fitting 18 to an inlet coolant header 24. Outlet hoses 26 connect the outlet end fitting 20 to an outlet coolant header 28. The fittings, for example fitting 20, are formed of a electrically conductive material such as copper.

Figure 2:
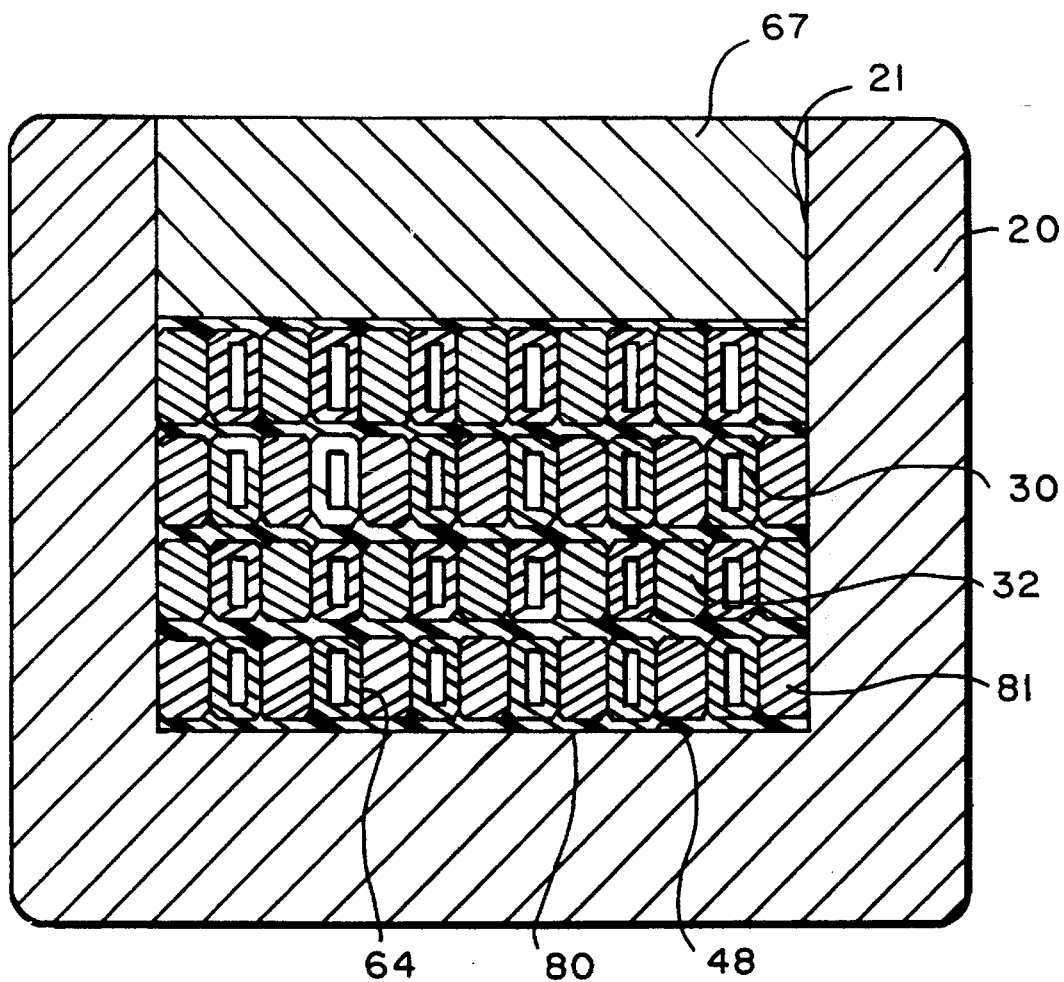
FIG. 2 is a representative end cross-sectional view of the strands of a stator bar within an end fitting.

As illustrated in FIG. 2, each stator bar includes a plurality of hollow and solid copper strands 30 and 32, respectively, disposed in side-by-side and superposed relation one to the other. The strands within the stator bar are brazed to one another, at joints 64, as well as to the interior walls of the end fitting 20, at joints 80. The brazing material 48 preferably comprises a copper phosphorous alloy with a certain silver concentration such as BCuP-1. As explained above, it is believed that the initiation of the leakage paths is caused by stagnant coolant liquid in the fitting in contact with the brazing material whereby corrosion is initiated. The potential areas of leak sites are at the brazed joints 64 between the strands 30, 32 and at the brazed joints 80 between the fitting 20 and the outermost strands 81.

Fittings typically are of an integral four sided type of housing or a three sided type of housing with a cut-out section on the fourth side. In a fitting that is four sided, a ring is utilized which is placed around the exterior surface of the strand bundle and compressed before insertion into the fitting. In a fitting that is three sided, the strand bundle is inserted into the fitting and then a window 67 is sized to be placed over a cut-out 21 in the fourth side to completely enclose the outer periphery of the end of the strand bundle within the fitting. As shown in FIG. 2, this window 67 functions as a means to compress the strands together in much the same manner as the ring accomplishes in a fitting which is four sided.

Figure 3:
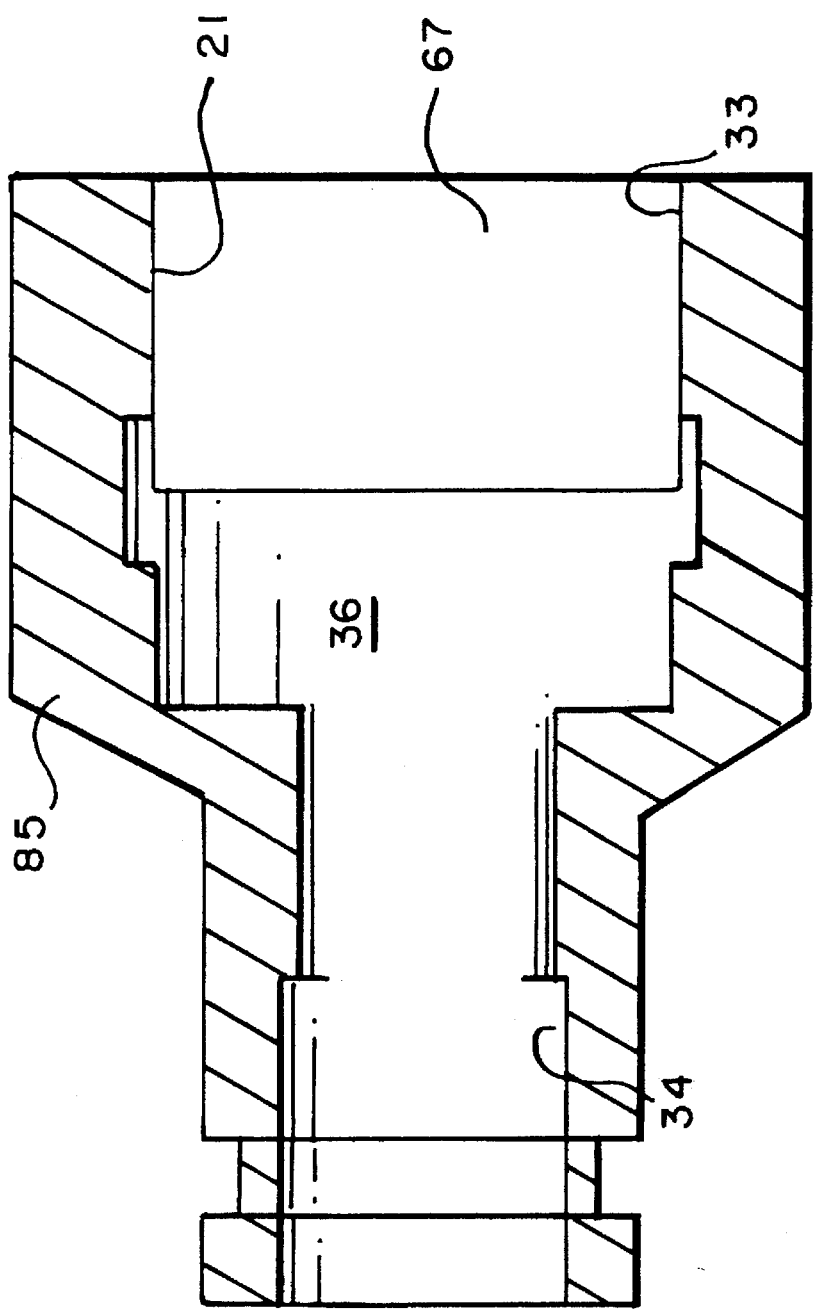
FIG. 3 is an illustration of a liquid cooled end fitting for a stator bar which utilizes a window section to allow tight compression of the strand bundle into the fitting.
Figure 4:
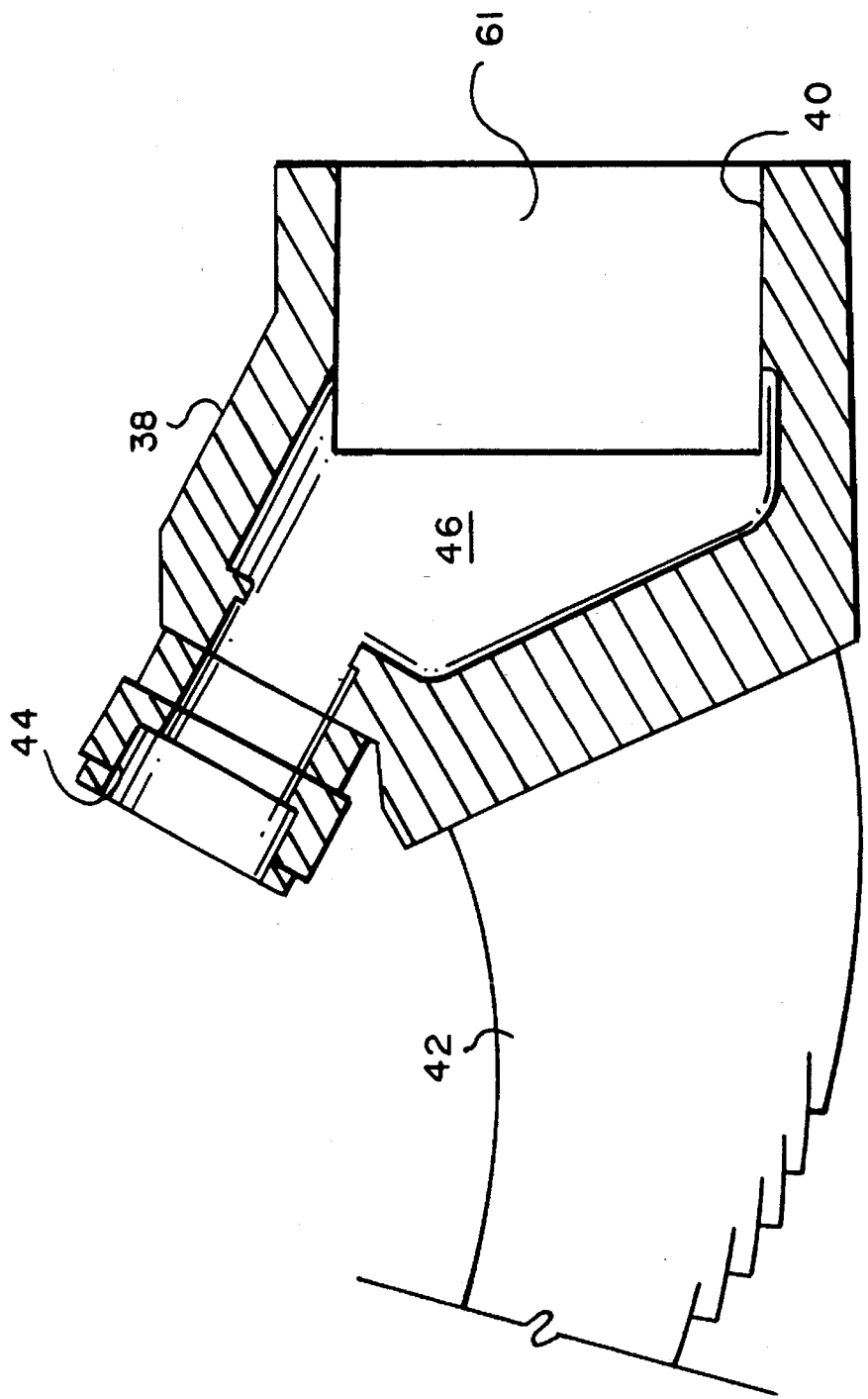
FIG. 4 is an illustration of a leaf type end fitting for a stator bar which utilizes a window section to allow tight compression of the strand bundle into the fitting.
Figure 5:
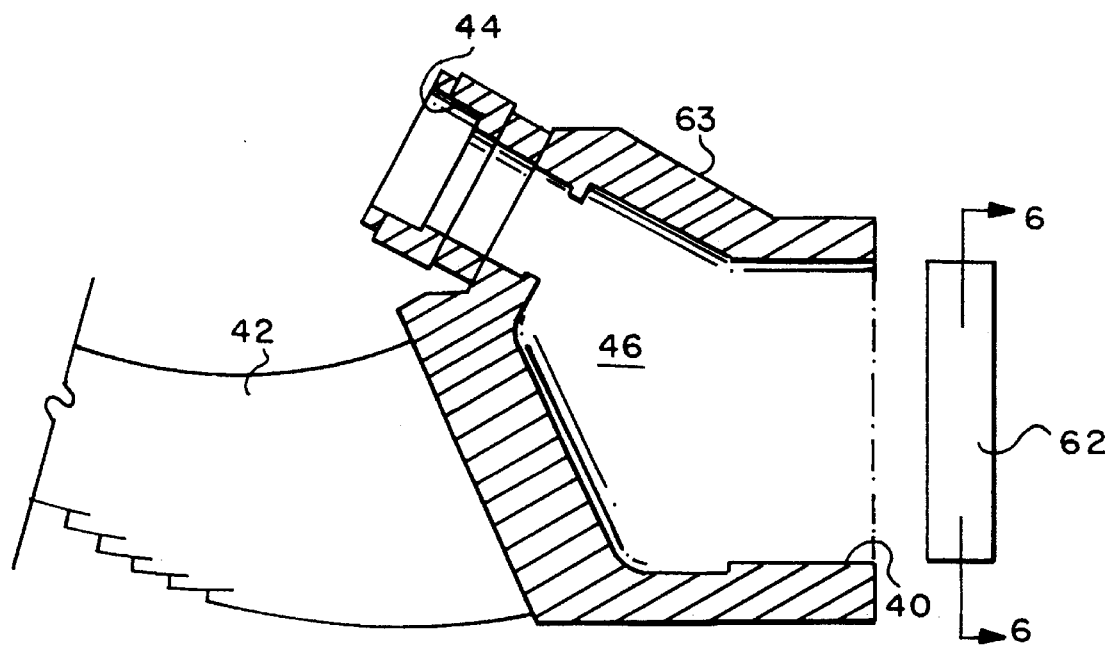
FIG. 5 is an illustration of a windowless variation of a leaf type end fitting for a stator bar which utilizes a sleeve to surround and compress the strand bundles and which is inserted into the fitting.

Illustrations of three types of fittings typically used by the assignee of the present invention are disclosed in FIGS. 3, 4 and 5. In FIG. 3, the fitting 85 comprises a closed body having a rectilinear opening 33 at one end for receiving the strands 30, 32 of the stator bar 16. At the opposite end, there is provided an opening 34 which in use is normally closed by a copper tube which serves as both an electrical connection, as well as a hydraulic conduit for flowing liquid coolant, e.g., deionized water, into or from the chamber 36 defined by the walls of the fitting 85 and the exposed ends of the hollow and solid copper strands. The liquid in the chamber 36 either flows into the fitting and through the hollow strands 30 for cooling purposes when the fitting comprises an inlet fitting or receives the liquid coolant from the hollow strands 30 for egress when the fitting is employed as an outlet fitting. Window 67 is inserted into cut out 21 so as to compress strands 30, 32 and then is brazed in place within the fitting 85 to allow for tight compression of the strand bundle.

In FIG. 4, the fitting 38 is similar to the fitting 85 of FIG. 3 and includes an opening 40 for receiving the ends of the hollow strands forming the stator bar 16. Conductible leaves 42 extend from the opposite end of this copper fitting 38 for electrical connection with like fittings. Offset opening 44 receives a hydraulic connection for flowing liquid coolant to or from the fitting 38, depending on whether the fitting is connected to the inlet or the outlet header. Fitting 38 defines a chamber 46 in communication with the copper strands and particularly the hollow strands 30 of the stator bar 16. As with end fitting 85 of FIG. 3, a window 61, located on one side of the fitting 38, is utilized prior to brazing with fitting 38 to allow for tight compression of the strand bundle.

In FIG. 5, the fitting 63 is similar to fitting 38 of FIG. 4 but, instead of having a window, a two piece ring 62 is placed around the exterior of the strand bundle and is used to compress the strand bundle before insertion into the fitting 63 prior to final brazing. This particular fitting was first used by the assignee of the present invention as early as 1966.

Figure 6:
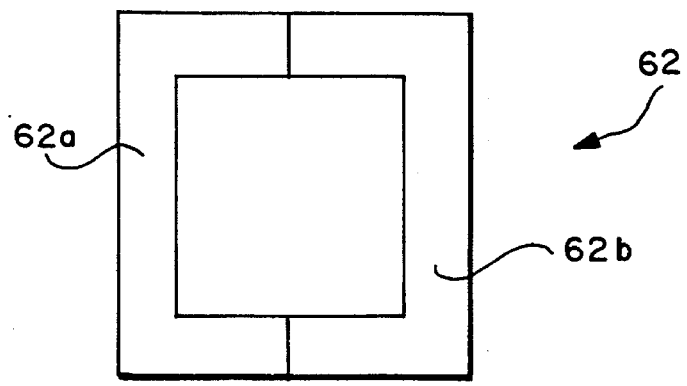
FIG. 6 is an illustration of the cross section of the sleeve of FIG. 5 with view taken along 6—6.

FIG. 6 provides a cross-sectional view of the two piece ring 62 of FIG. 5 taken along line 6—6. The ring 62 is comprised of two complementary and generally C-shaped parts, 62a and 62b, which are brazed to and compress the strands.

The end fitting 20 of FIGS. 1 and 2 is a generic representation. The end fittings 85, 38 and 63, as illustrated in FIGS. 3, 4 and 5 respectively, are specific examples of end fitting 20 which are in use.

Figure 7:
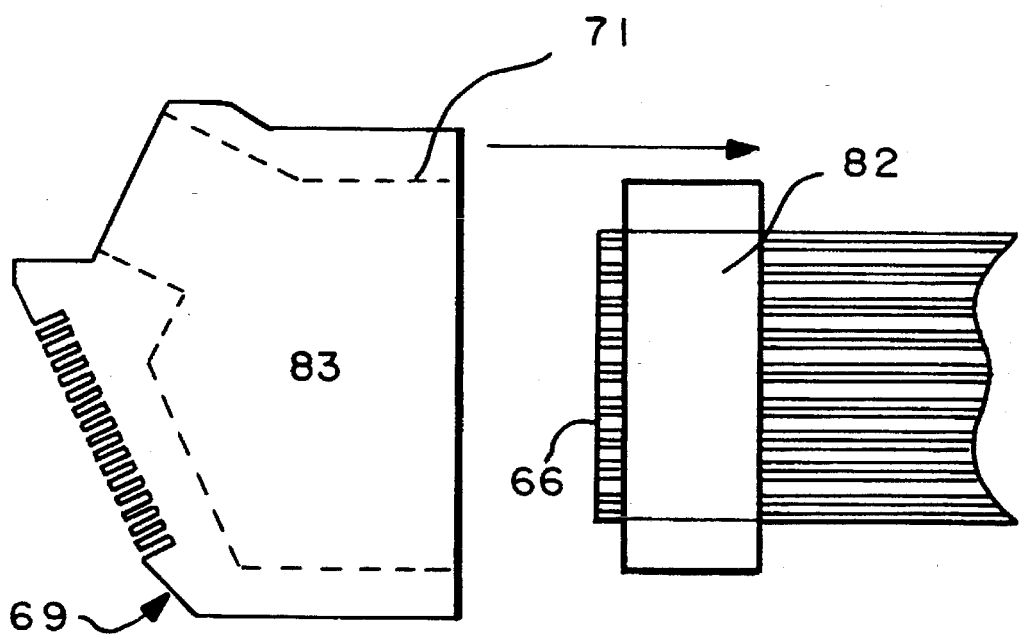
FIG. 7 is an exploded view illustrating the improved repair method of the subject invention.

In accordance with the repair method of the present invention, a replacement end fitting 69, as illustrated in FIG. 7, is provided which, externally, is geometrically similar to the original end fitting 20. The replacement end fitting 69 is four sided and preferably has no cut-out section on one side. The replacement end fitting 69 has an interior chamber 83 which is sized to fit over a continuous ring (ring) 82 allowing a lap joint 71. The ring 82 and the lap joint 71 are discussed below.

To employ the present invention, most, but not all, of the original end fitting 20 is removed at the generator site sufficiently to expose the ends 66 of the strands 30, 32 so that the leak paths can be cleaned, typically with a chemical solvent, and any voids can be braze repaired. Most of the original end fitting 20 may be removed, for example, by machining. The original braze between adjacent interior strands 30, 32 and between the outermost strands 81 and the original end fitting 20 remain undisturbed. A portion of the window section 67, if fitting 20 has been provided with a window, also remains such that all of the original braze with the outermost strands 81 remains undisturbed. The repair braze should have a lower temperature melting point alloy than the original braze.

As shown in FIG. 7, the remainder of the original end fitting 20 (with the original window 67) forms a continuous ring 82 preferably of rectangular shape around the end of the strand bundle so as to preserve the original geometry of the bundle. This ring 82 is then machined to allow for a lap joint fit 71 within the replacement end fitting 69 when the ring 82 is inserted into the replacement end fitting 69 prior to final brazing. The lap joint 71 is then brazed with a lower temperature melting point alloy than both the original and repair alloy(s) to prevent disturbing the original brazing operations. The replacement end fitting 69 of the repaired stator bar end may now be reconnected to the winding, insulated and returned to service in the same manner as that of a new bar. This is accomplished without the expense and additional time requirements of performing an in-kind stator bar end replacement.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of repairing a stator bar having a plurality of strands brazed with an original alloy into an end fitting surrounding one end of said strands, comprising the steps of:

removing a portion of said end fitting to expose the ends of the strands, the remaining portion of said end fitting shaped in the form of a continuous ring around said strands and having some original braze alloy remaining between said strands and said ring;

sealing any voids in the original braze between said strands and said ring by brazing with a second alloy;

inserting said ring and said strand ends into a replacement end fitting having an internal cavity shaped to receive said ring and said strand ends;

brazing said ring into said replacement end fitting.

2. The method according to claim 1 wherein the step of removing a portion of said end fitting is accomplished by machining.

3. The method according to claim 1 wherein at least one of said strands brazed into said end fitting is hollow.

4. The method according to claim 1 wherein the original end fitting has a side having a cut-out section over which is placed a window.

5. The method according to claim 1 wherein the original end fitting comprises a four sided housing.

6. The method according to claim 1 wherein the replacement end fitting comprises a four sided housing.

7. The method according to claim 1 further including the step of cleaning the areas between a strand and either an adjacent strand or the interior of said continuous ring prior to brazing a void.

8. The method according to claim 7 wherein the step of cleaning includes using a chemical solvent.

9. The method according to claim 1 wherein said void is braze repaired with a repair alloy whose temperature melting point is lower than that of the original alloy.

10. The method according to claim 1 wherein said replacement end fitting is brazed with an alloy whose temperature melting point is lower than either the original or repair alloys used so as not to disturb the original braze during said brazing process.

11. A method of repairing a stator bar having a plurality of strands brazed with an original alloy into an end fitting surrounding one end of said strands, comprising the steps of:

removing a portion of said end fitting to expose the ends of the strands, the remaining portion of said end fitting shaped in the form of a continuous ring around said strands and having some original braze alloy remaining between said strands and said ring;

sealing any voids in the original braze between the strands by brazing;

inserting said ring and said strand ends into a replacement end fitting having an internal cavity shaped to receive said ring and said strand ends;

brazing said ring into said replacement end fitting.

12. The method according to claim 1 wherein the step of removing a portion of said end fitting is accomplished by machining.

13. The method according to claim 1 wherein at least one of said strands brazed into said end fitting is hollow.

14. The method according to claim 1 wherein the original end fitting has a side having a cut-out section over which is placed a window.

15. The method according to claim 1 wherein the original end fitting comprises a four sided housing.

16. The method according to claim 1 wherein the replacement end fitting comprises a four sided housing.

17. The method according to claim 1 further including the step of cleaning the areas between a strand and either an adjacent strand or the interior of said continuous ring prior to brazing a void.

18. The method according to claim 7 wherein the step of cleaning includes using a chemical solvent.

19. The method according to claim 1 wherein said void is braze repaired with a repair alloy whose temperature melting point is lower than that of the original braze.

20. The method according to claim 11 wherein said ring is brazed into said replacement fitting with an alloy whose temperature melting point is lower than either the original or repair alloys used so as not to disturb the such brazes during said brazing process.

21. A method of repairing a stator bar having a plurality of strands brazed with an original alloy into an end fitting surrounding one end of said strands, comprising the steps of:

removing a portion of said end fitting to expose said one end of the strands, the remaining portion of said end fitting shaped in the form of a continuous ring around said strands and having some original braze alloy remaining between said strands and said ring;

sealing voids in the original braze alloy between the remaining strands; and securing a replacement end fitting to said continuous ring.

22. A method of repairing a stator bar having a plurality of strands brazed with an original alloy into an end fitting surrounding one end of said strands, comprising the steps of:

removing a portion of said end fitting to expose said one end of the strands, the remaining portion of said end fitting shaped in the form of a continuous ring around said strands and having some original braze alloy remaining between said strands and said ring;

sealing any voids in the original braze alloy between said strands and said ring by brazing with a second alloy; and brazing a replacement end fitting having a cavity to receive said one end of said strands to said continuous ring.

* * * * *